(12) United States Patent
Brannigan et al.

(10) Patent No.: US 12,169,920 B2
(45) Date of Patent: Dec. 17, 2024

(54) TELECENTRIC DETECTION OF LATTICE BREAKDOWN

(71) Applicant: Honeywell Federal Manufacturing & Technologies, LLC, Kansas City, MO (US)

(72) Inventors: Eric Michael Brannigan, Lenexa, KS (US); Benjamin Ross Brown, Lee's Summit, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 562 days.

(21) Appl. No.: 17/568,861

(22) Filed: Jan. 5, 2022

(65) Prior Publication Data
US 2023/0214978 A1    Jul. 6, 2023

(51) Int. Cl.
| | |
|---|---|
| G02B 13/22 | (2006.01) |
| G01M 5/00 | (2006.01) |
| G06T 7/00 | (2017.01) |
| H04N 23/90 | (2023.01) |

(52) U.S. Cl.
CPC ......... *G06T 7/0002* (2013.01); *G01M 5/0033* (2013.01); *G01M 5/0091* (2013.01); *H04N 23/90* (2023.01)

(58) Field of Classification Search
CPC .................................................... G02B 13/22
See application file for complete search history.

(56) References Cited

U.S. PATENT DOCUMENTS

| | | | |
|---|---|---|---|
| 7,180,084 B2 | 2/2007 | Weiss et al. | |
| 8,413,493 B1 | 4/2013 | Polywoda, III | |
| 9,599,558 B2 | 3/2017 | Westphal et al. | |
| 9,606,345 B2 | 3/2017 | Uhl et al. | |
| 2020/0217651 A1 | 7/2020 | Zhao et al. | |
| 2021/0018446 A1 | 1/2021 | Terahai et al. | |

FOREIGN PATENT DOCUMENTS

JP    2019-144129    *    8/2019    ............ G01B 11/25

* cited by examiner

*Primary Examiner* — Joseph P Martinez
(74) *Attorney, Agent, or Firm* — Hovey Williams LLP

(57) ABSTRACT

A method of detecting a deformation in a lattice structure comprises capturing first image data of the lattice structure via a first image capturing device with a first telecentric lens and a second image capturing device with a second telecentric lens. The first telecentric lens is directed toward the lattice structure, and the second telecentric lens is spaced apart from the first telecentric lens and also directed toward the lattice structure. The method includes compressing the lattice structure; capturing second image data of the lattice structure via the first and second image capturing devices; and detecting the deformation based at least in part on the first and second image data.

20 Claims, 8 Drawing Sheets

TELECENTRIC DETECTION OF LATTICE BREAKDOWN

STATEMENT REGARDING FEDERALLY-SPONSORED RESEARCH OR DEVELOPMENT

This invention was made with Government support under Contract No.: DE-NA-0002839 awarded by the United States Department of Energy/National Nuclear Security Administration. The Government has certain rights in the invention.

BACKGROUND

Lattice structures are integrated into various components to reduce weight, energy requirements, and advanced manufacturing time for building said components. Lattice structures often have unique attributes related to energy distribution, compressibility, and the like. However, measuring these attributes and determining energy distribution behavior are difficult. Further, quality control tests on components with lattice structures are likewise also difficult to accomplish.

The background discussion is intended to provide information related to the present invention which is not necessarily prior art.

SUMMARY OF THE INVENTION

The present invention solves the above-described problems and other problems by providing systems and methods of detecting a deformation in a lattice structure that enable capturing detailed and accurate models of lattice structure deformation behavior.

A method according to an embodiment of the present invention broadly comprises capturing first image data of the lattice structure via a first image capturing device with a first telecentric lens and a second image capturing device with a second telecentric lens. The first telecentric lens is directed toward the lattice structure, and the second telecentric lens is spaced apart from the first telecentric lens and also directed toward the lattice structure. The method includes compressing the lattice structure; capturing second image data of the lattice structure via the first and second image capturing devices; and detecting the deformation based at least in part on the first and second image data.

A system constructed according to an embodiment of the present invention broadly comprises a platen, a first image capturing device, a second image capturing device, and a processing element. The platen supports the lattice structure, and the first image capturing device includes a first telecentric lens directed toward the platen. The second image capturing device includes a second telecentric lens spaced apart from the first telecentric lens and directed toward the platen.

The processing element is in communication with the first image capturing device and the second image capturing device and is configured to receive image data from the first image capturing device and the second image capturing device and detect the deformation in the lattice structure based at least in part on the image data. The telecentric lenses are able to look through the repeating structure of the lattice structure so that data can be captured on all struts of the lattice structure that are deformed.

A method of detecting a deformation in a lattice structure according to another embodiment of the present invention comprises capturing first image data of the lattice structure. The first image data is captured via a first image capturing device with a first telecentric lens directed toward the lattice structure and a second image capturing device with a second telecentric lens spaced apart from the first telecentric lens and directed toward the lattice structure. The method comprises compressing the lattice structure; capturing second image data of the lattice structure via the first and second image capturing devices; comparing the first image data with the second image data to determine a difference; and detecting the deformation based at least in part on the difference between the first image data and the second image data.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
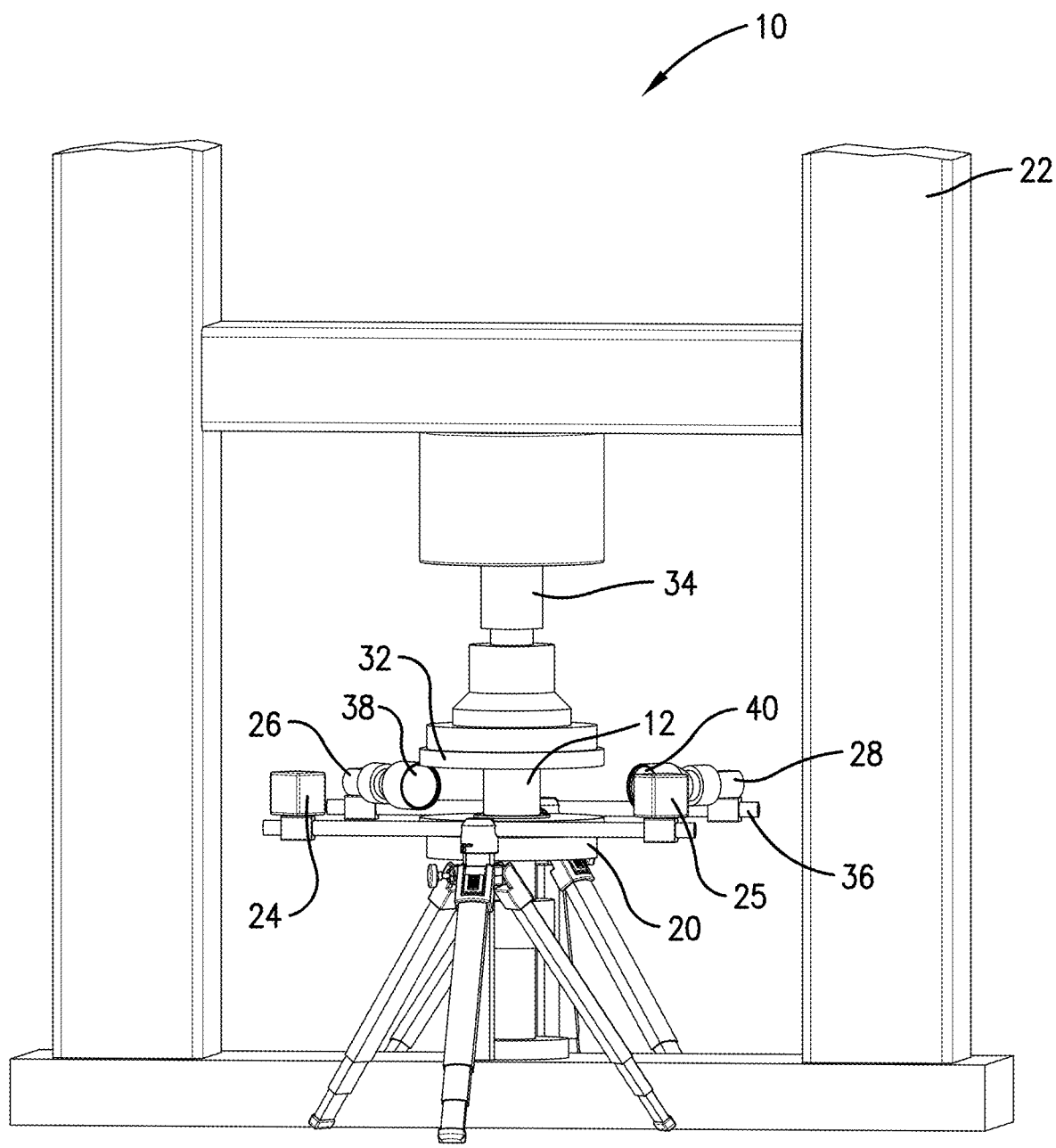
FIG. 1 is a perspective view of a system constructed in accordance with embodiments of the present invention.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Figure 4:
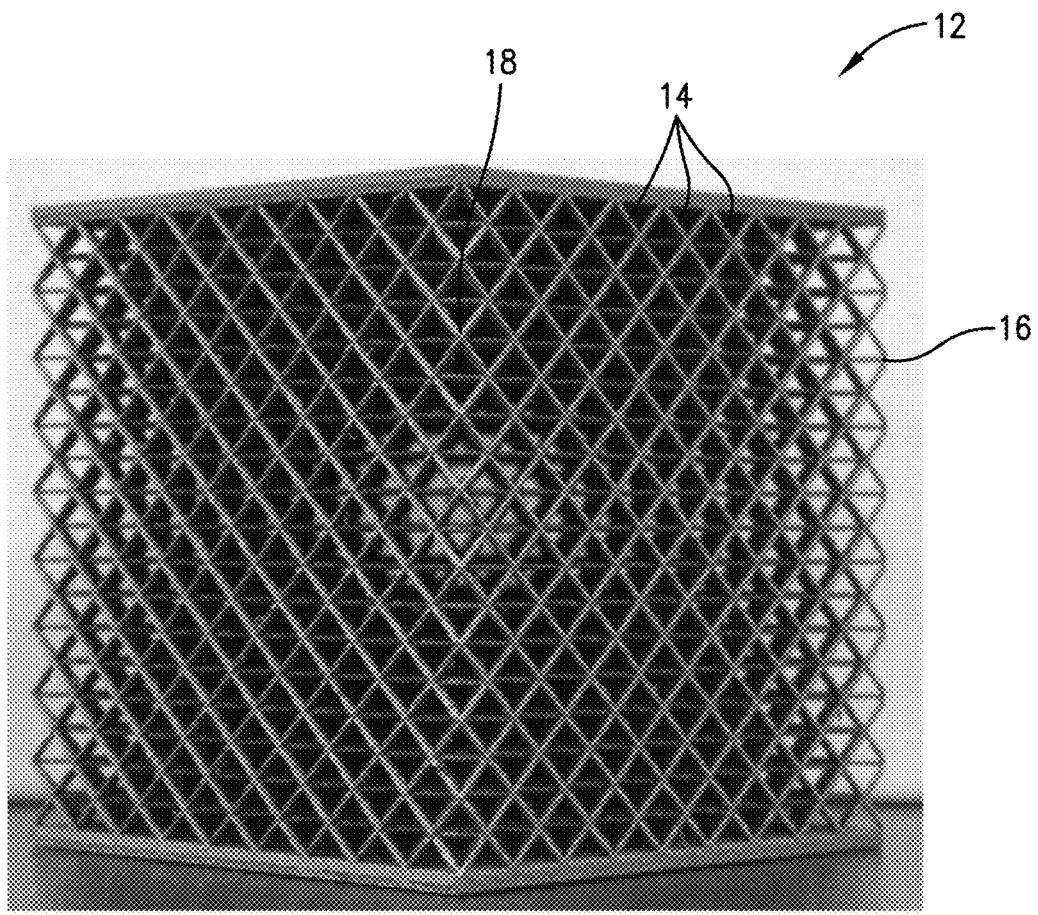
FIG. 4 is an image of an exemplary lattice structure.

Turning to FIG. 1, a system 10 constructed in accordance with an embodiment of the invention is illustrated. The system 10 detects a deformation in a lattice structure 12. Turning briefly to FIG. 4, an exemplary lattice structure 12 is depicted. The lattice structure 12 may comprise a three-dimensional printed object formed with a plurality of struts 14 that are interconnected in a pattern. The lattice structure 12 may be a cubic structure with a plurality of edges 16, 18. However, the system 10 may be operable to test different types of lattice structures 12 without departing from the scope of the present invention. For example, the lattice structure 12 may be shaped differently and may be made of a variety of materials, such as metal, plastic, or the like. Further, the lattice structures 12 may comprise different types of unit cells with different strut patterns.

Figure 3:
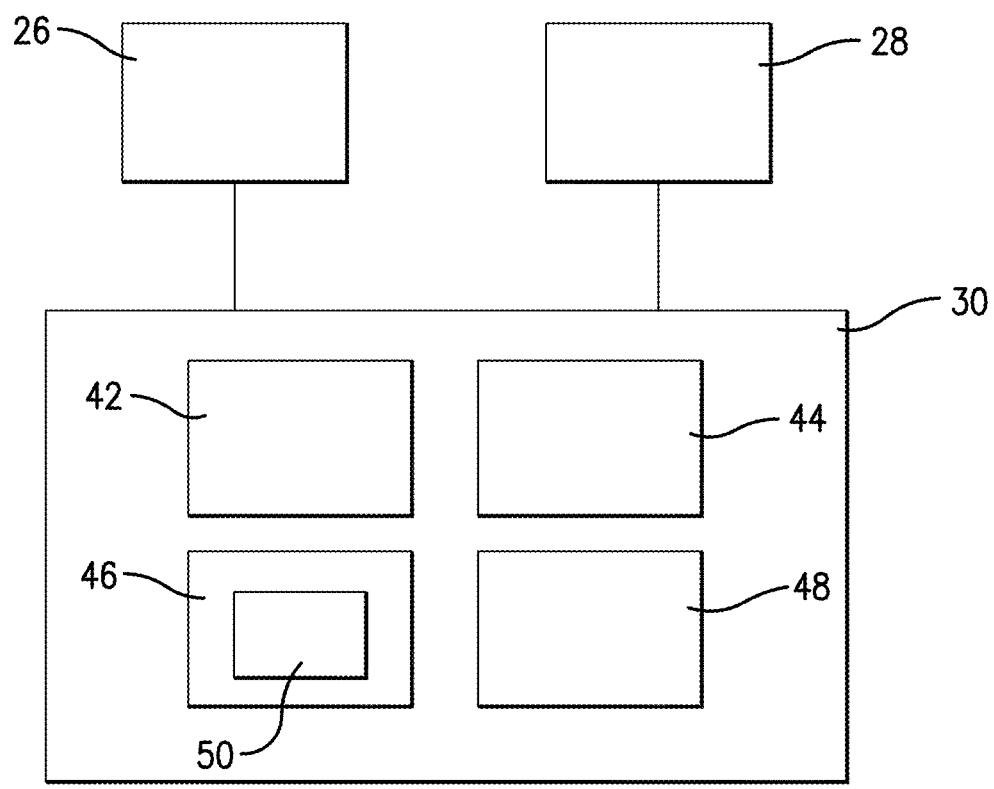
FIG. 3 is a block diagram depicting selected components of the system of FIG. 1.

Turning back to FIG. 1, the system 10 comprises a lower platen 20, a press 22, a first light source 24, a second light source 25, a first image capturing device 26, a second image capturing device 28, and a controller 30 (depicted in FIG. 3). The lower platen 20 supports the lattice structure 12 thereon and may be part of the press 22. The press 22 may comprise a upper platen 32 and an actuator 34 operable to extend the upper platen 32 toward the lower platen 20 to apply a pressure on the lattice structure 12.

Figure 2:
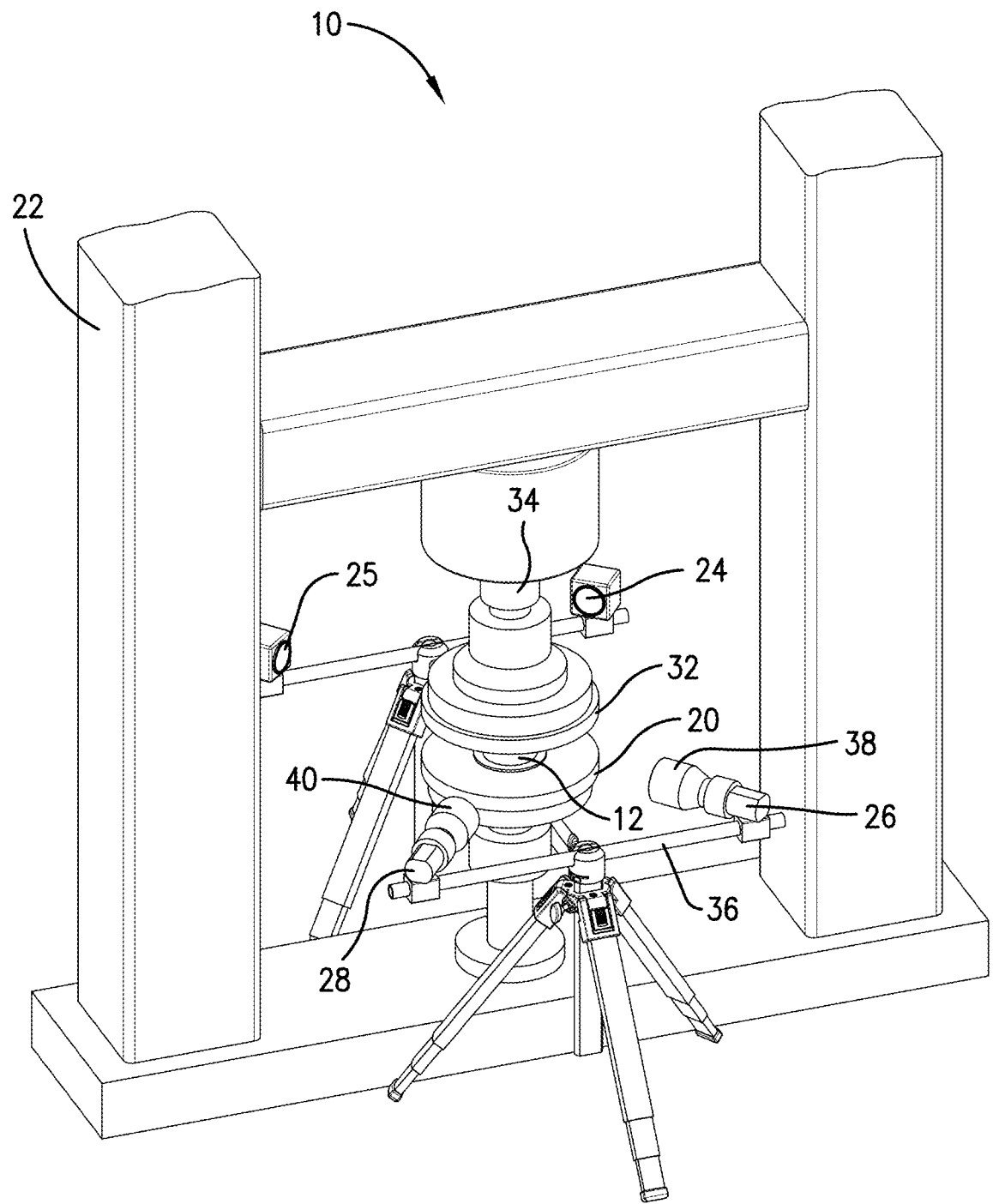
FIG. 2 is an elevated view of the system of FIG. 1.

Turning to FIG. 2, the light sources 24, 25 may be directed at the lower platen 20 and positioned on an opposite side of the lower platen 20 relative to the first and second image capturing devices 26, 28 in order to provide backlights for capturing images of the lattice structure 12. The light sources 24, 25 may be supported by one or more adjustable stands. In some embodiments, the first light source 24 is directly across the lattice structure 12 from first image capturing device 26, and the second light source 25 is directly across the lattice structure 12 from second image capturing device 28. The system 10 may include any number of light sources without departing from the scope of the present invention. For example, in some embodiments, the system 10 may include only one light source 24 that is wide enough to provide backlighting for all the image capturing devices 26, 28.

The image capturing devices 26, 28 are operable to capture image data of the lattice structure 12. Each of the image capturing devices 26, 28 may include a telecentric lens 38, 40 directed toward the lower platen 20. The telecentric lens 38 of the first image capturing device 26 may be directed at a first edge 16 of the lattice structure 12, and the telecentric lens 40 of the second image capturing device 28 may be directed at a second edge 18 of the lattice structure 12. The second edge 18 may be adjacent to the first edge 16. The telecentric lens 40 of the second image capturing device 28 may be spaced apart from the other telecentric lens 38. In some embodiments, the second telecentric lens 40 may be spaced angularly about 90 degrees from the first telecentric lens 38. However, the angular spacing between the lenses 38, 40 may be adjusted depending on the shape of the lattice structure 12. Further, the system 10 may include any number of image capturing devices 26, 28 without departing from the scope of the present invention. The image capturing devices 26, 28 may be supported by an adjustable stand 36. The stand 36 may be adjustable to allow for repositioning of the image capturing devices 26, 28.

Figure 5:
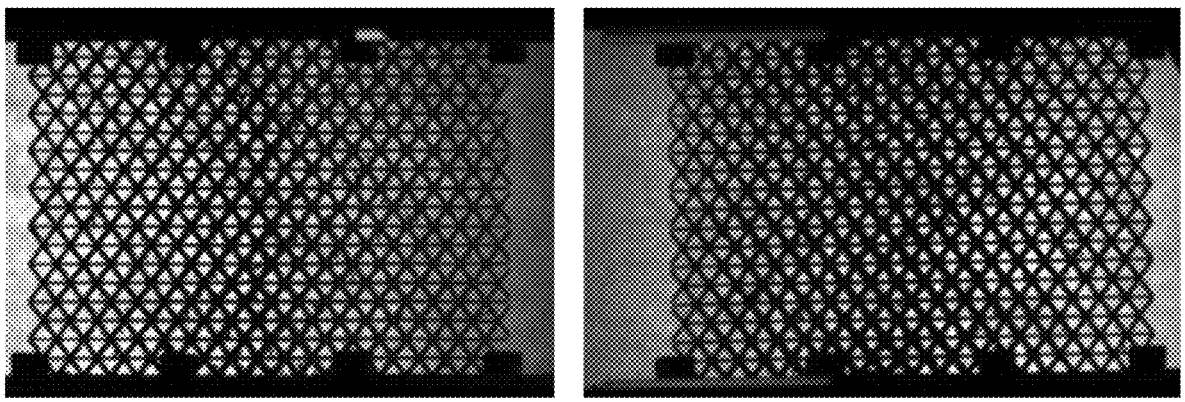
FIG. 5 is an exemplary image of the lattice structure of FIG. 4 captured according to an embodiment of the present invention.
Figure 8:
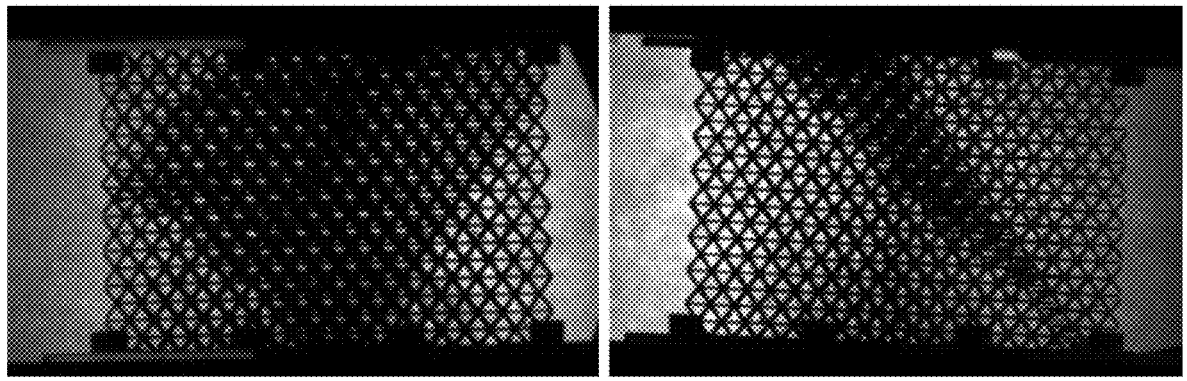
FIG. 8 is an exemplary image of the lattice structure of FIG. 4 after being deformed captured according to an embodiment of the present invention.

The image capturing devices 26, 28 may be configured to capture image data of the lattice structure 12 before deformation of the lattice structure 12 and capture image data of the lattice structure 12 after the press 22 compresses the lattice structure 12 to produce a deformation in the lattice structure 12. The image data may be digital images or the like as depicted in FIGS. 5 and 8. The image on the left in FIG. 5 is an exemplary image of the lattice structure 12 captured by the first image capturing device 26 when directed at the first edge 16 of the lattice structure 12. The image on the right in FIG. 5 is an exemplary image of the lattice structure 12 captured by the second image capturing device 28 when directed at the second edge 18 of the lattice structure 12. The image on the left in FIG. 8 is an exemplary image of the lattice structure 12 captured by the first image capturing device 26 when directed at the first edge 16 of the lattice structure 12 after being deformed. The image on the right in FIG. 8 is an exemplary image of the lattice structure 12 captured by the second image capturing device 28 when directed at the second edge 18 of the lattice structure 12 after being deformed. As shown in FIG. 8, the deformation may be a breakage, bending, warping, etc. of the struts 14 of the lattice structure 12. The telecentric lenses 38, 40 are able to look through the repeating structure of the lattice structure 12 so that data can be captured on all the struts 14 that are deformed.

Turning to FIG. 3, the controller 30 is in communication with the image capturing devices 26, 28 and may comprise a communication element 42, a memory element 44, a user interface 46, and a processing element 48. The communication element 42 may generally allow communication with systems or devices external to the controller 30. The communication element 42 may include signal or data transmitting and receiving circuits, such as antennas, amplifiers, filters, mixers, oscillators, digital signal processors (DSPs), and the like. The communication element 42 may establish communication wirelessly by utilizing RF signals and/or data that comply with communication standards such as cellular 2G, 3G, 4G, 5G, or LTE, WiFi, WiMAX, Bluetooth®, BLE, or combinations thereof. The communication element 42 may be in communication with the processing element 48 and the memory element 44.

The memory element 44 may include data storage components, such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. In some embodiments, the memory element 44 may be embedded in, or packaged in the same package as, the processing element 48. The memory element 44 may include, or may constitute, a "computer-readable medium". The memory element 44 may store the instructions, code, code segments, software, firmware, programs, applications, apps, services, daemons, or the like that are executed by the processing element 48.

The user interface 46 generally allows the user to utilize inputs and outputs to interact with the controller 30 and is in communication with the processing element 48. Inputs may include buttons, pushbuttons, knobs, jog dials, shuttle dials, directional pads, multidirectional buttons, switches, keypads, keyboards, mice, joysticks, microphones, or the like, or combinations thereof. The outputs of the present invention include a display 50 but may include any number of additional outputs, such as audio speakers, lights, dials, meters, printers, or the like, or combinations thereof, without departing from the scope of the present invention.

The processing element 48 may include processors, microprocessors (single-core and multi-core), microcontrollers, DSPs, field-programmable gate arrays (FPGAs), analog and/or digital application-specific integrated circuits (ASICs), or the like, or combinations thereof. The processing element 48 may generally execute, process, or run instructions, code, code segments, software, firmware, programs, applications, apps, processes, services, daemons, or the like. The processing element 48 may also include hardware components such as finite-state machines, sequential and combinational logic, and other electronic circuits that can perform the functions necessary for the operation of the current invention. The processing element 48 may be in communication with the other electronic components through serial or parallel links that include address buses, data buses, control lines, and the like.

Figure 6:
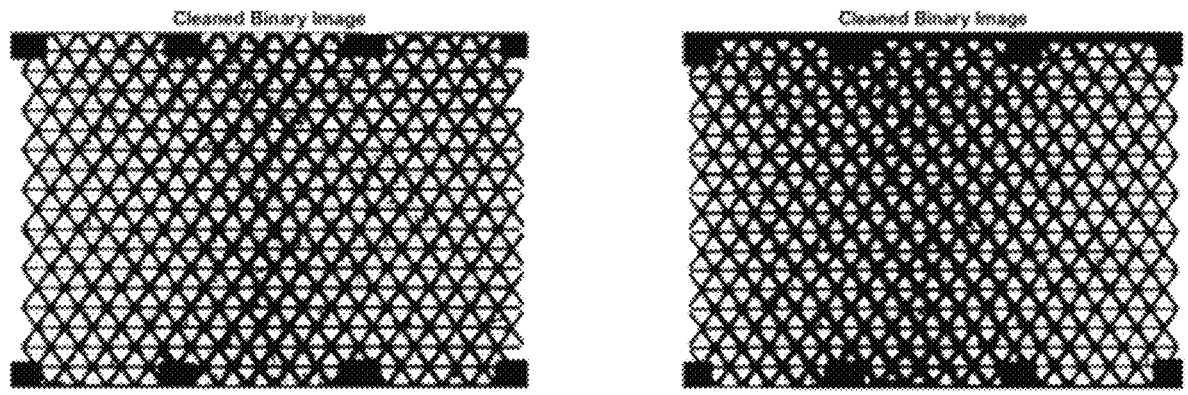
FIG. 6 is an exemplary cleaned version of the image of FIG. 5.
Figure 9:
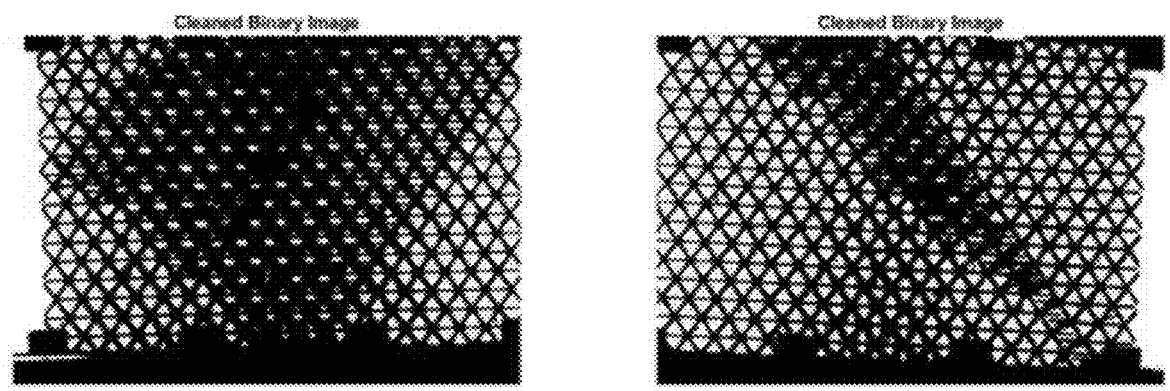
FIG. 9 is an exemplary cleaned version of the image of FIG. 8.

For example, the controller 30 is in communication with the first image capturing device 26 and the second image capturing device 28 and is configured to receive image data from the first image capturing device 26 and the second image capturing device 28. The processing element 48 may be configured to combine the image data from the first image capturing device 26 with the image data from the second image capturing device 28. In some embodiments, the image data may comprise data streams from the first and second image capturing devices 26, 28, and the processing element 48 may be configured to combine them into a single stream. The processing element 48 of the controller 30 may be configured to enhance the image data using image processing algorithms, as depicted in FIGS. 6 and 9, to produce cleaned versions of the image data.

Figure 7:
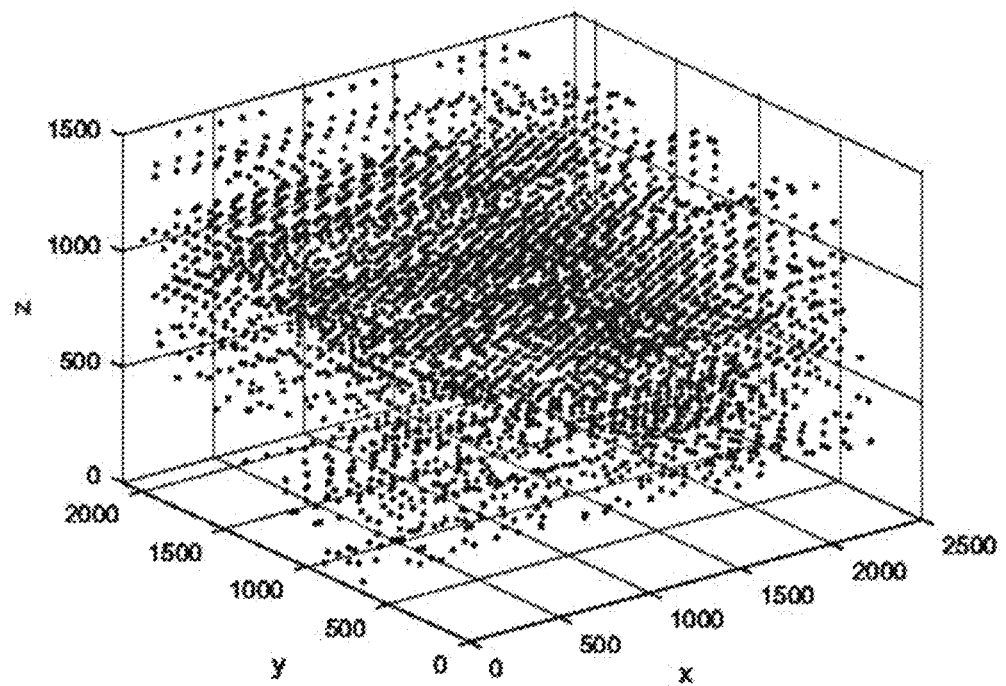
FIG. 7 is an exemplary model of the lattice structure based on the image of FIG. 6 generated in accordance with an embodiment of the present invention.
Figure 10:
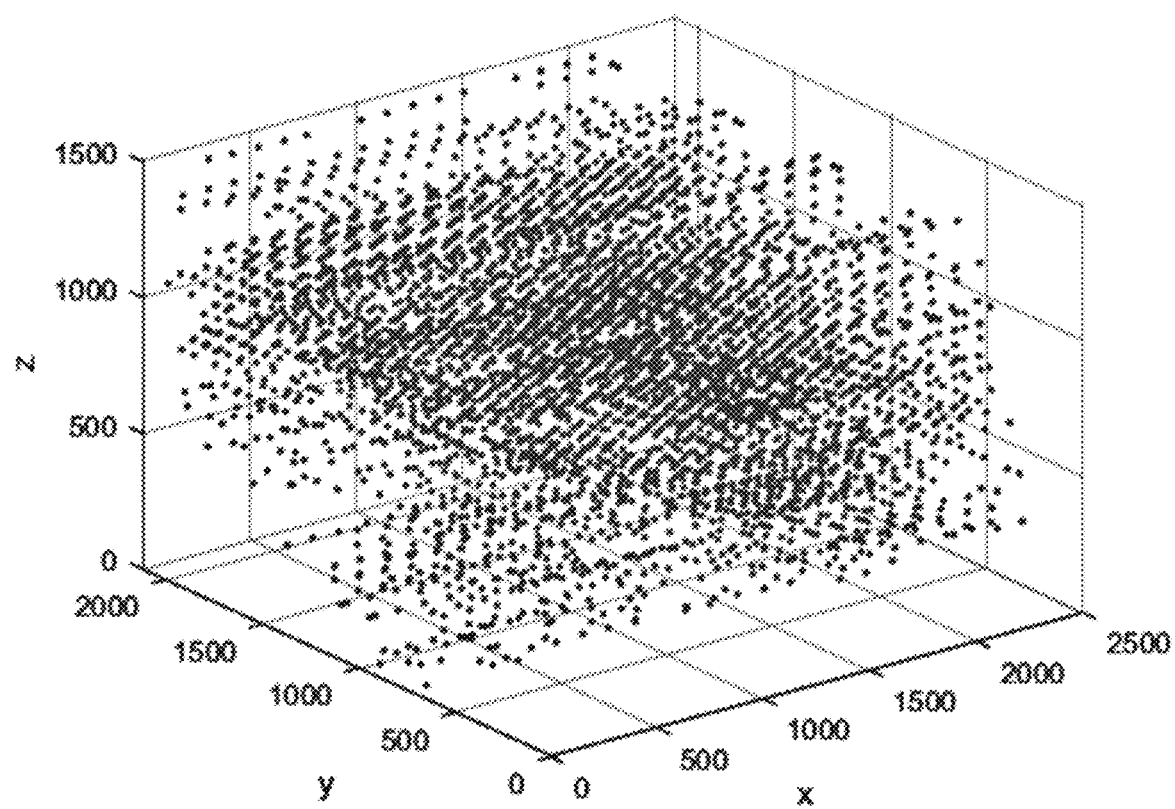
FIG. 10 is an exemplary model of the lattice structure based on the image of FIG. 9 generated in accordance with an embodiment of the present invention.

The processing element 48 may be configured to analyze the image data to detect the deformation in the lattice structure 12. For example, the processing element 48 may be configured to detect a set of datapoints representative of voids in the image data representing the images of the lattice structure 12 prior to deformation ("first set of datapoints"). The datapoints may include pixels that meet a threshold, and the processing element 48 may be configured to tag the pixels in their rows and columns as voids. The processing element 48 may be configured to detect a set of datapoints representative of voids in the image data representing the images of the lattice structure 12 after deformation ("second set of datapoints"). The processing element 48 may be configured to map the first and second set of datapoints as three-dimensional models and render them on the display 50, as depicted in FIGS. 7 and 10, respectively.

The processing element 48 may be configured to detect the deformation based at least in part on the plurality of datapoints representative of voids. For example, the processing element 48 may be configured to compare the first set of datapoints and the second set of datapoints to find any differences. The processing element 48 may be configured to designate the differences in datapoints as a third set of datapoints representative of voids filled by one or more broken or deformed struts. The processing element 48 may be configured to determine that the each datapoint in the third set of datapoints meets a threshold to be considered a filled void. The determination of deformation and mapping of the datapoints enable a user to visualize and study deformation behavior of different types of lattice structures 12.

Figure 11:
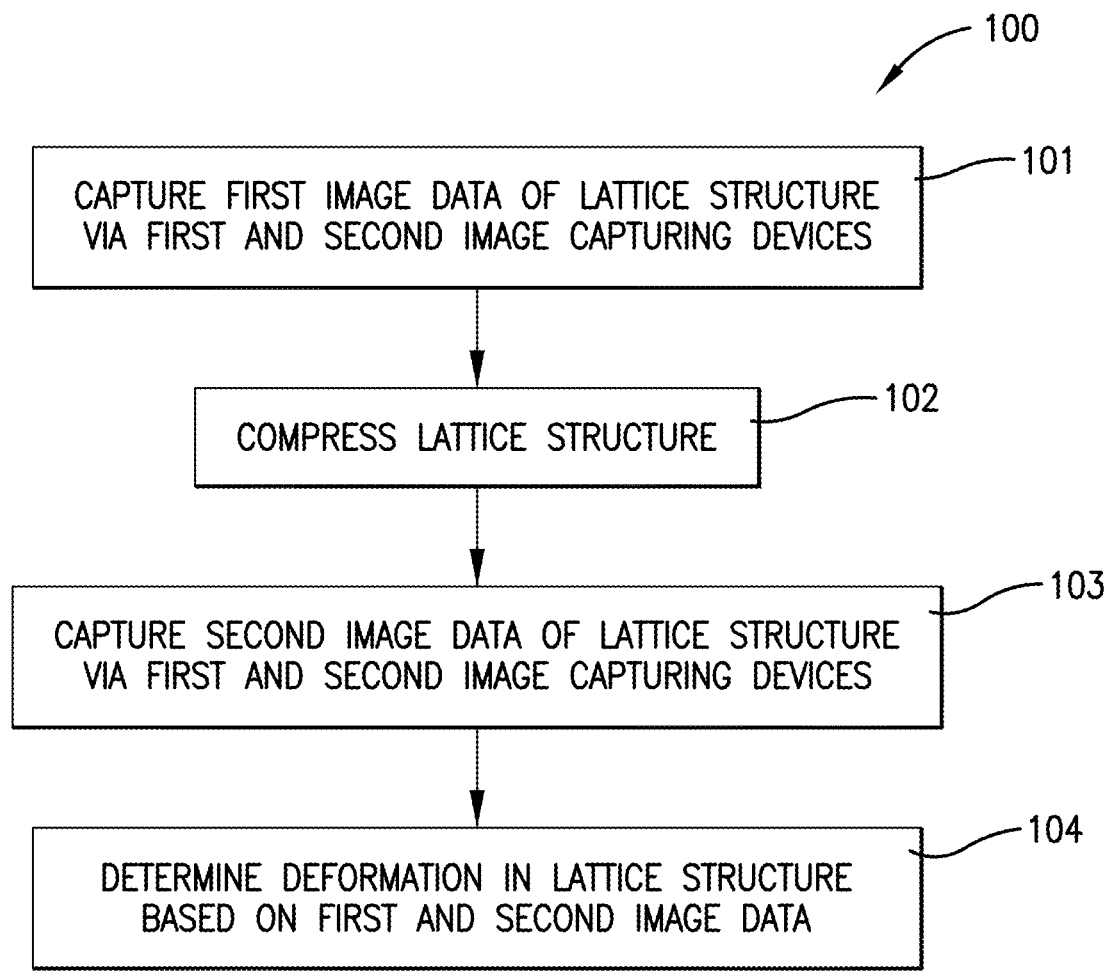
FIG. 11 is a flowchart depicting exemplary steps of a method according to an embodiment of the present invention.

The flow chart of FIG. 11 depicts the steps of an exemplary method 100 of monitoring operations of an irrigation system. In some alternative implementations, the functions noted in the various blocks may occur out of the order depicted in FIG. 11. For example, two blocks shown in succession in FIG. 11 may in fact be executed substantially concurrently, or the blocks may sometimes be executed in the reverse order depending upon the functionality involved. In addition, some steps may be optional.

The method 100 is described below, for ease of reference, as being executed by exemplary devices and components introduced with the embodiments illustrated in FIGS. 1-3. The steps of the method 100 may be performed by the controller 30 through the utilization of processors, transceivers, hardware, software, firmware, or combinations thereof. However, some of such actions may be distributed differently among such devices or other devices without departing from the spirit of the present invention. Control of the system may also be partially implemented with computer programs stored on one or more computer-readable medium(s). The computer-readable medium(s) may include one or more executable programs stored thereon, wherein the program(s) instruct one or more processing elements to perform all or certain of the steps outlined herein. The program(s) stored on the computer-readable medium(s) may instruct processing element(s) to perform additional, fewer, or alternative actions, including those discussed elsewhere herein.

Referring to step 101, first image data of the lattice structure is captured via first and second image capturing devices with telecentric lenses directed at the lattice structure. The image data may be captured with the telecentric lenses being spaced apart from one another and directed at different edges of the lattice structure. This step may include directing light at the lattice structure on an opposite side of the lattice structure relative to the lenses. This step may also include receiving image data from the first image capturing device and image data from the second image capturing device and combining, via the processing element, the image data from the devices. In some embodiments, the first image data may comprise a data stream.

Referring to step 102, the lattice structure may be compressed via the press. The lattice structure may be compressed until a deformation is formed in the lattice structure. The deformation may be a broken or otherwise out of place strut of the lattice structure.

Referring to step 103, second image data may be captured of the lattice structure in its deformed state. The second image data is captured via the first image capturing device and the second image capturing device. The telecentric lens of the first image capturing device may be spaced apart angularly as the telecentric lens of the second image capturing device. When capturing second image data, each telecentric lens may be directed at the same edge of the lattice structure as when the first image data was captured. For example, the telecentric lens of the first image capturing device may be directed at a first edge of the lattice structure when the first image data is captured, and the first image capturing device may be directed at that same first edge of the lattice structure when the second image data is captured. This step may also include directing light at the lattice structure on an opposite side of the lattice structure relative to the lenses. This step may also include receiving image data form the first image capturing device and image data from the second image capturing device and combining, via the processing element, the image data from the devices. In some embodiments, the second image data may comprise a data stream.

Referring to step 104, the deformation in the lattice structure may be detected based at least in part on the first image data and the second image data. For example, the first image data and the second image data may be compared to determine a difference. This may include detecting in the first image data and the second image data a plurality of datapoints representative of voids through which unobstructed light travels through the lattice structure from the light source to the lenses. A first set of such datapoints may be derived, via the processing element, from the first image data. A second set of datapoints representative of voids may be derived, via the processing element, from the second image data. This step may include comparing the first set of datapoints with the second set of datapoints to determine a third set of datapoints representative of filled voids. The filled voids may be representative of the spaces filled by struts of the deformation. This step may include determining, via the processing element, a region of the deformation based at least in part on the third data set. This step may also include enhancing the first and second image data to produce cleaned versions of the image data. For example, image processing algorithms may be employed to produce cleaned versions of the image data that provide better definition to the void spaces.

The method 100 may include additional, less, or alternate steps and/or device(s), including those discussed elsewhere herein. For example, the first and/or second sets of datapoints may be mapped into a three-dimensional model, via the processing element, and displayed on a display of a user interface.

Additional Considerations

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A method of detecting a deformation in a lattice structure, the method comprising:
capturing first image data of the lattice structure via a first image capturing device with a first telecentric lens directed toward the lattice structure and a second image capturing device with a second telecentric lens spaced apart from the first telecentric lens and directed toward the lattice structure;
compressing the lattice structure;
capturing second image data of the lattice structure via the first image capturing device and the second image capturing device; and
detecting the deformation based at least in part on the first image data and the second image data.

2. The method of claim 1, wherein the first telecentric lens is directed at a first edge of the lattice structure.

3. The method of claim 2, wherein the second telecentric lens is directed at a second edge of the lattice structure that is adjacent to the first edge.

4. The method of claim 1, further comprising directing light at the lattice structure on an opposite side of the lattice structure relative to the first telecentric lens and the second telecentric lens.

5. The method of claim 1, wherein the deformation comprises a broken strut of the lattice structure.

6. The method of claim 1, further comprising detecting in the first image data and the second image data a plurality of datapoints representative of voids.

7. The method of claim 6, wherein the detecting step comprises detecting the deformation based at least in part on the plurality of datapoints representative of voids.

8. A system for detecting a deformation in a lattice structure, the system comprising:
a platen for supporting the lattice structure;
a first image capturing device with a first telecentric lens directed toward the platen;
a second image capturing device with a second telecentric lens spaced apart from the first telecentric lens and directed toward the platen; and
a processing element in communication with the first image capturing device and the second image capturing device and configured to
receive image data from the first image capturing device and the second image capturing device, and
detect the deformation in the lattice structure based at least in part on the image data.

9. The system of claim 8, wherein the first telecentric lens is oriented relative to the platen so that when the lattice structure is positioned on the platen, the first telecentric lens is directed at a first edge of the lattice structure.

10. The system of claim 9, wherein the second telecentric lens is oriented relative to the platen so that when the lattice structure is positioned on the platen, the second telecentric lens is directed at a second edge of the lattice structure that is adjacent to the first edge.

11. The system of claim 8, further comprising a light source directed at the platen and positioned on an opposite side of the platen relative to the first telecentric lens and the second telecentric lens.

12. The system of claim 8, wherein the image data is first image data representative of the lattice structure before pressure, and the processing element is configured to receive second image data from the first image capturing device and the second image capturing device, the second image data representative of the lattice structure under pressure, and detect the deformation in the lattice structure based at least in part on the first image data and the second image data.

13. The system of claim 12, wherein the processing element is configured to detect a plurality of datapoints representative of voids in the first image data and the second image data.

14. The system of claim 13, wherein the processing element is configured to detect the deformation based at least in part on the plurality of datapoints representative of voids.

15. The system of claim 8, wherein the platen is a lower platen, further comprising an upper platen and an actuator operable to extend the upper platen toward the lower platen.

16. A method of detecting a deformation in a lattice structure, the method comprising:

capturing first image data of the lattice structure via a first image capturing device with a first telecentric lens directed toward the lattice structure and a second image capturing device with a second telecentric lens spaced apart from the first telecentric lens and directed toward the lattice structure;

compressing the lattice structure;

capturing second image data of the lattice structure via the first image capturing device and the second image capturing device;

comparing the first image data and the second image data to determine a difference; and detecting the deformation based at least in part on the difference between the first image data and the second image data.

17. The method of claim 16, further comprising detecting a first set of datapoints representative of voids based at least in part on the first image data.

18. The method of claim 17, further comprising detecting a second set of datapoints representative of voids based at least in part on the second image data.

19. The method of claim 18, further comprising comparing the first set of datapoints with the second set of datapoints to determine a third set of datapoints representative of filled voids.

20. The method of claim 19, further comprising determining a region of the deformation based at least in part on the third set of datapoints.

* * * * *